July 18, 1950  S. MEYERSON  2,515,884
EXPANSION BRACELET
Filed Oct. 22, 1946
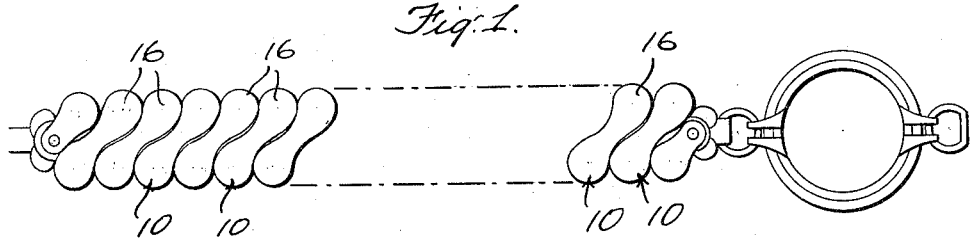
Fig. 1.
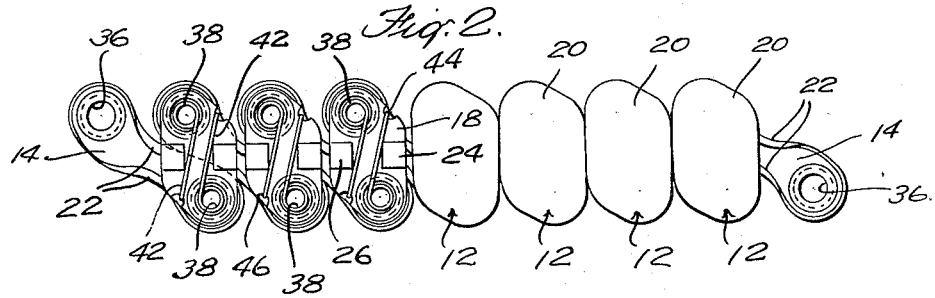
Fig. 2.
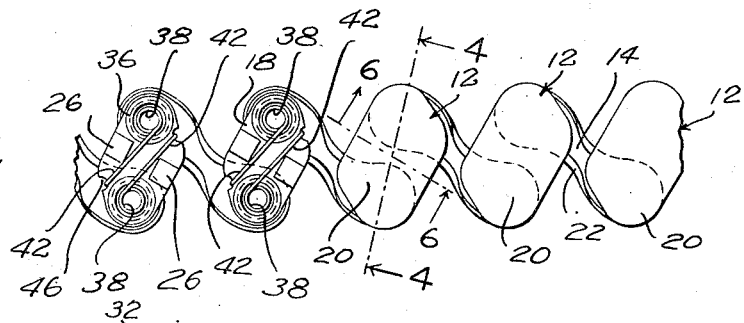
Fig. 3.
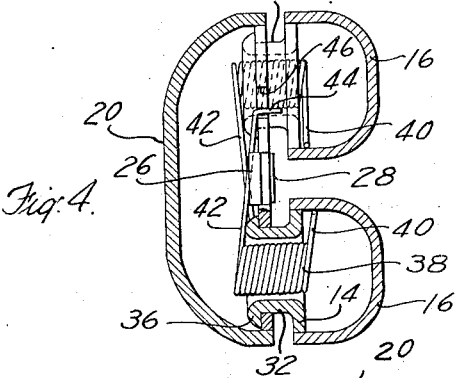
Fig. 4.
Fig. 5.
Fig. 6.
Inventor
SAMUEL MEYERSON
By
Moses, Nolte, Crews & Berry
Attorneys

Patented July 18, 1950

2,515,884

UNITED STATES PATENT OFFICE 2,515,884

EXPANSION BRACELET

Samuel Meyerson, Brooklyn, N. Y.

Application October 22, 1946, Serial No. 704,951

1 Claim. (Cl. 59—79)

This invention relates to expansion linkage useful for bracelets or similar purposes.

The principal object of the invention is to provide an expansible linkage made up of a series of articulated hollow links of improved construction provided with spring means for retracting the links so as to normally draw the linkage to contracted position. If used for a bracelet or the like, this construction permits the linkage to expand so that it may be slipped over the hand onto the wrist where it will be retracted sufficiently to maintain its position. Specific objects and advantages of the invention will appear in connection with the following detailed description of one form of bracelet embodying the invention.

In the accompanying drawings which show one preferred embodiment of the invention:

Fig. 1 is a plan view of the outside of a linkage embodying the invention;

Fig. 2 is a similar view on an enlarged scale of the opposite face of the linkage, certain of the inside shells being omitted to show the springs;

Fig. 3 is a view similar to Fig. 2 with the linkage partly extended;

Fig. 4 is a transverse section on line 4—4 of Fig. 3 showing the parts further enlarged;

Fig. 5 is a perspective view of one of the inside plates; and

Fig. 6 is a section of one of the inside links taken on line 6—6 of Fig. 3.

Referring to the drawings in detail:

The linkage is made up of articulated links of two types, marked 10 and 12, respectively. Preferably, the links 10 are so designed as to form the outer or visible side of the bracelet and will be designated as "outside links," while links 12 will be referred to as "inside links." It will be understood, however, that this arrangement may be reversed if desired.

The links 10 are hollow, being formed of plates 14 to which are attached the outside shells 16. The inside links are also hollow, being composed of the inside plates 18 and the inside shells 20. The outside shells are secured to the outside plates 14 in any suitable manner as by being flanged over as indicated at 22 in Fig. 2. For securing the inside shells to the inside plates, the latter are preferably provided with pressed offset portions 26, as shown in Fig. 5. The shells 20 are provided with tongues 28 which are bent around the offsets and into the recesses 30 formed by such offsetting, as shown in Fig. 6. The links are articulated to one another by means of hollow pivots 32 which may conveniently be formed integral with the plates 14 and upon which the plates 18 are pivoted. The plates 18 have holes 34 therein of sufficient size to rotate freely upon the pivots 32. The pivots 32 are flanged over at 36 so as to hold the links together.

The improved spring construction of the present invention comprises the coil springs 38, one mounted in each of the hollow pivots, such springs having upper end portions 40 located inside of the outer shells 16 and exerting pressure in the side walls of said shells. The lower ends of the springs 38 have arms 42 which extend over the lower plates 18, the ends of the arms being hooked as indicated at 44 and engaging in notches 46 formed in the sides of the plates. The arms 42 extend diagonally across the plates just inside of the offset portions 26 which preferably engage the sides of the arms, thereby helping to hold the springs with the hooked ends properly engaged in the notches 46. The construction is very compact as the arms 42 pass close to the surface of the plate 18, and the assembly of the ends of the springs in the notches may be very simply and quickly accomplished.

In operation, it will be seen that one end of each spring 40 bears against an outer link, while the other end of the same spring hooks into one of the notches 46 and bears directly against the side of the inside plate forming a part of the inner link. Thus the tendency is to swing adjacent inner links and outer links towards each other into the position shown in Fig. 2 and keep the linkage retracted.

It will be observed that the inside links 18, 20 have straight, parallel sides which are adapted to contact when the bracelet is retracted as shown in Fig. 2, the lines of contact being substantially at right angles to the longitudinal axis of the bracelet. It will also be observed that the centers of the pivots are offset with respect to a center line transverse to the longitudinal axis of the bracelet so that one of the pivots is nearer to one of the sides of the link and the other pivot is nearer to the other side of the link. Thus the axis passing through the two pivot centers is at a substantial angle to the sides of the link. This angularity of the link axis results in a favorable distribution of angularity between the inner and outer links, the inner links before expansion sloping in the same direction as the outer links but to a less degree. As the axes of the inner links swing from an angle at one side of a vertical axis (Fig. 2) to a reverse angle at the opposite side of the vertical (Fig. 3) it will be seen that a considerable expansion of the bracelet is possible before there is any diminution in the width of the band or any change in the angularity of the outside links. Thus the initial pattern or appearance of the bracelet except for a limited separation of the links is preserved. A smaller number of links is needed for a given length of bracelet than would be the case if the pivot centers of the inside links were in a line at right angles to the longitudinal axis of the linkage as wider links may be used. At the same time the links abut one another along vertical lines producing a smooth effect for the inner surface of the bracelet, with maximum comfort to the wearer. The straight transverse line formation of the adjacent edges of the inside links also facilitates true curving of the band when bent around the wrist and also helps to prevent twisting of the band, particularly when straightened out for exhibition prior to attachment to the watch. The simplicity of the form of the links permits them to be made by simple dies and makes the construction inexpensive. The links are also wider than the minimum width which would be required to receive the pivots and this extra width facilitates the application and anchoring of the spring ends. In the particular embodiment of the invention shown the ends of the link shells 20 lie in straight parallel lines inclined to the sides of the links so that they are of rhomboidal form with rounded corners but the link and shell ends may be otherwise shaped if desired, provided the ends of the links are so formed as not to protrude beyond the end margins of the outer links as the band expands.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be embodied.

What I claim is:

An expansible and retractable linkage comprising alternating outside links and inside links and hollow pivots connecting the ends of said links, lines passing through the pivot centers of the outside and inside links all being substantially inclined to the longitudinal axis of the linkage before expansion, alternate links being inclined in the same direction but at different angles, the inside links having substantially straight longitudinal sides lying in lines substantially at right angles to the longitudinal axis of the linkage when the linkage is fully contracted, the centers of the pivots of each inside link being located respectively one nearer to one side surface of the link and the other nearer to the other side surface of the link, so that a line connecting such pivots is at a substantial angle to the side edges of the link, the ends of the inner links lying substantially adjacent to the ends of the outer links during normal expansion of the band, and springs for retracting said linkage, each spring having a coiled portion fitting in a hollow pivot and having arms exerting retracting pressure on the links.

SAMUEL MEYERSON.

REFERENCES CITED

The following references are of record in the file of this patent:

UNITED STATES PATENTS

| Number | Name | Date |
|---|---|---|
| 2,267,967 | Augenstein | Dec. 30, 1941 |
| 2,376,633 | Szeglin et al. | May 22, 1945 |